US012266160B2

(12) United States Patent
He et al.

(10) Patent No.: US 12,266,160 B2
(45) Date of Patent: Apr. 1, 2025

(54) MASKED AUTOENCODERS FOR COMPUTER VISION

(71) Applicant: Meta Platforms, Inc., Menlo Park, CA (US)

(72) Inventors: Kaiming He, Palo Alto, CA (US); Piotr Dollar, San Mateo, CA (US); Ross Girshick, Seattle, WA (US); Saining Xie, Sunnyvale, CA (US); Xinlei Chen, Belmont, CA (US); Yanghao Li, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 360 days.

(21) Appl. No.: 17/875,210

(22) Filed: Jul. 27, 2022

(65) Prior Publication Data
US 2024/0096072 A1 Mar. 21, 2024

(51) Int. Cl.
*G06V 10/778* (2022.01)
*G06V 10/26* (2022.01)
*G06V 10/75* (2022.01)
*G06V 10/774* (2022.01)

(52) U.S. Cl.
CPC .......... *G06V 10/778* (2022.01); *G06V 10/26* (2022.01); *G06V 10/751* (2022.01); *G06V 10/774* (2022.01)

(58) Field of Classification Search
CPC .... G06V 10/778; G06V 10/26; G06V 10/751; G06V 10/774; G06V 10/82
See application file for complete search history.

(56) References Cited

U.S. PATENT DOCUMENTS

| 11,373,064 | B2* | 6/2022 | Goldstein | G06F 18/24 |
|---|---|---|---|---|
| 12,119,090 | B1* | 10/2024 | Kraus | G06T 5/73 |
| 12,119,091 | B1* | 10/2024 | Kraus | G06V 10/82 |
| 12,131,406 | B2* | 10/2024 | Liu | G06T 5/70 |
| 12,141,236 | B1* | 11/2024 | Arici | G06F 40/30 |
| 2018/0176576 | A1* | 6/2018 | Rippel | G06N 3/08 |

(Continued)

OTHER PUBLICATIONS

Ba J.L., et al., "Layer Normalization," arXiv preprint arXiv: 1607.06450, 2016, 14 pages.

(Continued)

*Primary Examiner* — Wesley J Tucker
(74) *Attorney, Agent, or Firm* — BakerHostetler

(57) ABSTRACT

In particular embodiments, a computing system may access a plurality of images for pre-training a first machine-learning model that includes an encoder and a decoder. Using each image, the system may pre-train the model by dividing the image into a set a patches, selecting a first subset of the patches to be visible and a second subset of the patches to be masked during the pre-training, processing, using the encoder, the first subset of patches to generate corresponding first latent representations, processing, using the decoder, the first latent representations corresponding to the first subset of patches and mask tokens corresponding to the second subset of patches to generate reconstructed patches corresponding to the second subset of patches, the reconstructed patches and the first subset of patches being used to generate a reconstructed image, and updating the model based on comparisons between the image and the reconstructed image.

20 Claims, 10 Drawing Sheets
(8 of 10 Drawing Sheet(s) Filed in Color)

(56) References Cited

U.S. PATENT DOCUMENTS

| | | | |
|---|---|---|---|
| 2020/0279131 A1* | 9/2020 | Sha | G06F 18/214 |
| 2021/0042503 A1* | 2/2021 | Karras | G06T 7/70 |
| 2023/0410483 A1* | 12/2023 | Chen | G06V 10/7753 |
| 2024/0144019 A1* | 5/2024 | Weinzaepfel | G06V 40/10 |
| 2024/0254585 A1* | 8/2024 | Song | C22C 38/02 |
| 2024/0338802 A1* | 10/2024 | Yoon | G06N 3/084 |

OTHER PUBLICATIONS

Bao H., et al., "Beit: Bert Pre-Training Of Image Transformers," arXiv:2106.08254, 2021, 16 pages.
Becker S., et al., "Self-Organizing Neural Network that Discovers Surfaces in Random-Dot Stereograms," Nature, Jan. 9, 1992, vol. 355, pp. 161-163.
Brown T.B., et al., "Language Models are Few-Shot Learners," arXiv:2005.14165, 2020, 75 pages.
Caron M., et al., "Emerging Properties in Self-Supervised Vision Transformers," International Conference on Computer Vision (ICCV), 2021, pp. 9650-9660.
Chen M., et al., "Generative Pretraining from Pixels," International Conference on Machine Learning (ICML), 2020, 13 pages.
Chen T., et al., "A Simple Framework for Contrastive Learning of Visual Representations," Machine Learning, 2020, 17 pages.
Chen X., et al., "An Empirical Study of Training Self-Supervised Vision Transformers," International Conference on Computer Vision (ICCV), 2021, pp. 9640-9649.
Chen X., et al., "Exploring Simple Siamese Representation Learning," Computer Vision and Pattern Recognition (CVPR), 2021, pp. 15750-15758.
Clark K., et al., "ELECTRA: Pre-training Text Encoders as Discriminators Rather Than Generators," arXiv preprint arXiv:2003.10555, 2020, 18 pages.
Cortes C., et al., "Support-Vector Networks," Machine learning, 1995, pp. 273-297.
Cubuk E.D., et al., "Randaugment: Practical Automated Data Augmentation with a Reduced Search Space," Computer Vision and Pattern Recognition (CVPR), 2020, 10 pages.
Deng J., et al., "ImageNet: A Large-Scale Hierarchical Image Database," 2009 IEEE Conference on Computer Vision and Pattern Recognition, Aug. 18, 2009, 8 Pages.
Devlin J., et al., "BERT: Pre-Training of Deep Bidirectional Transformers for Language Understanding," In Proceedings of the 2019 Confer-ence of the North American Chapter of the Association for Computational Linguistics: Human Language Tech-nologies, vol. 1 (Long and Short Papers), 2019, 16 pages.
Doersch C., et al., "Unsupervised Visual Representation Learning by Context Prediction," Proceedings of the IEEE International Conference on Computer Vision (ICCV), 2015, pp. 1422-1430.
Dosovitskiy A., et al., "An Image is Worth 16×16 words: Transformers for Image Recognition at Scale," International Conference on Learning (ICLR), 2021, 21 pages.
Gidaris S., et al., "Unsupervised Representation Learning by Predicting Image Rotations," International Conference on Learning Representations (ICLR), 2018, 16 pages.
Glorot., et al., "Understanding the Difficulty of Training Deep Feed forward Neural Networks," In Proceedings of The Thirteenth International Conference on Artificial Intelligence and Statistics, 2010, pp. 249-256.
Goyal P., et al., "Accurate, Large Minibatch SGD: Training ImageNet in 1 Hour," arXiv preprint, arXiv: 1706.02677, Apr. 30, 2018, 12 pages.
Goyal P., et al., "Self-Supervised Pretraining of Visual Features in the Wild," arXiv:2103.01988, Mar. 2021, 12 pages.
Grill J-B., et al., "Bootstrap Your Own Latent—A New Approach to Self-Supervised Learning," Neural Information Processing Systems (NeurIPS 2020), 14 pages.
Hadsell R., et al., "Dimensionality Reduction by Learning an Invariant Mapping," Computer Vision and Pattern Recognition (CVPR), 2006, 8 pages.
He K., et al., "Deep Residual Learning for Image Recognition," In Proceedings of The IEEE Conference on Computer Vision and Pattern Recognition, 2016, pp. 770-778.
He K., et al., "Mask R-CNN," In Proceedings of the IEEE International Conference on Computer Vision, 2017, pp. 2961-2969.
He K., et al., "Momentum Contrast for Unsupervised Visual Representation Learning," Proceedings of the IEEE/CVF Conference on Computer Vision and Pattern Recognition (CVPR), 2020, pp. 9729-9738.
Hendrycks D., et al., "Benchmarking Neural Network Robustness to Common Corruptions and Perturbations," International Conference on Learning Representations (ICLR), 2019, 16 pages.
Hendrycks D., et al., "Natural Adversarial Examples," Computer Vision and Pattern Recognition (CVPR), 2021, pp. 15262-15271.
Hendrycks D., et al., "The Many Faces of Robustness: A Critical Analysis of Out-of-Distribution Generalization," International Conference on Computer Vision (ICCV), 2021, 10 pages.
Hinton G.E., et al., "Autoencoders, Minimum Description Length and Helmholtz Free Energy," In NeurIPS, 1994, 8 pages.
Horn G.V., et al., "The iNaturalist Species Classification and Detection Dataset," Computer Vision and Pattern Recognition (CVPR), 2018, pp. 8769-8778.
Huang G., et al., "Deep Networks with Stochastic Depth," European Conference on Computer Vision, 2016, vol. 9908 LNCS, pp. 646-661.
Ioffe S., et al., "Batch Normalization: Accelerating Deep Network Training by Reducing Internal Covariate Shift," In: Proceedings of the 32nd International Conference on Machine Learning, 2015, vol. 37, pp. 448-456.
Kim I., et al., "Quality-Agnostic Image Recognition via Invertible Decoder," Proceedings of the IEEE/CVF Conference on Computer Vision and Pattern Recognition, 2021, pp. 12257-12266.
Krizhevsky A., et al., "ImageNet Classification with Deep Convolutional Neural Networks," Advances in Neural Information Processing Systems, Jan. 2012, vol. 25 (2), 9 Pages.
Lecun Y., et al., "Backpropagation Applied to Handwritten Zip Code Recognition," Neural Computation, 1989, vol. 1(4), pp. 541-551.
Li Y., et al., "Benchmarking Detection Transfer Learning with Vision Transformers," arXiv preprint arXiv:2111.11429, 2021, 9 pages.
Lin T-Y., et al., "Feature Pyramid Networks for Object Detection," In Proceedings of the IEEE Conference on Computer Vision and Pattern Recognition, 2017, pp. 2117-2125.
Lin T-Y., et al., "Microsoft COCO: Common Objects in Context," In European Conference on Computer Vision, Springer, 2014, pp. 740-755.
Loshchilov I., et al., "Decoupled Weight Decay Regularization," International Conference on Learning Representations (ICLR), 2019, 19 pages.
Loshchilov I., et al., "SGDR: Stochastic Gradient Descent with Warm Restarts," Machine Learning, 2017, pp. 1-16.
Mahajan D., et al., "Exploring the Limits of Weakly Supervised Pretraining," Proceedings of the European Conference on Computer Vision (ECCV), 2018, 16 pages.
Mao X., et al., "Towards Robust Vision Transformer," Proceedings of the IEEE/CVF Conference on Computer Vision and Pattern Recognition (CVPR), 2021, pp. 12042-12051.
Noroozi M., et al., "Unsupervised Learning of Visual Representations by Solving Jigsaw Puzzles," European conference on computer vision, Springer, Cham, 2016, pp. 69-84.
Oord A., et al., "Neural Discrete Representation Learning," In Advances in Neural Information Processing Systems, 2017, pp. 1-11.
Oord A., et al., "Representation Learning with Contrastive Predictive Coding," Machine Learning, 2018, pp. 1-13.
Pathak D., et al., "Context Encoders: Feature Learning by Inpainting," In Proceedings of the IEEE Conference on Computer Vision and Pattern Recognition, 2016, pp. 2536-2544.
Pathak D., et al., "Learning Features by Watching Objects Move," Proceedings of the IEEE Conference on Computer Vision and Pattern Recognition (CVPR), 2017, pp. 2701-2710.

(56) References Cited

OTHER PUBLICATIONS

Radford A., et al., "Language Models are Unsupervised Multitask Learners," 2019, 24 pages.

Radford A., et al., "Improving Language Understanding by Generative Pre-Training," 2018, 12 pages.

Raffel C., et al., "Exploring the Limits of Transfer Learning with a Unified Text-to-Text Transformer," arXiv preprint arXiv: 1910.10683, 2019, 67 pages.

Ramesh A., et al., "Zero-Shot Text-to-Image Generation," International Conference on Machine Learning (ICML), 2021, 11 pages.

Simonyan K., et al., "Very Deep Convolutional Networks for Large-Scale Image Recognition," arXiv: 1409.1556, Published as a Conference Paper at ICLR, Apr. 10, 2015, 14 pages.

Szegedy C., et al., "Rethinking the Inception Architecture for Computer Vision," Proceedings of the IEEE Conference on Computer Vision and Pattern Recognition, 2016, pp. 2818-2826.

Touvron H., et al., "Fixing the Train-Test Resolution Discrepancy," arXiv:1906.06423, 2019, 14 pages.

Touvron H., et al., "Grafit: Learning Fine-Grained Image Representations with Coarse Labels," Proceedings of the IEEE/CVF International Conference on Computer Vision (ICCV), 2021, pp. 874-884.

Touvron H., et al., "Training Data-Efficient Image Transformers & Distillation through Attention," arXiv preprint arXiv:2012.12877, 2021, 22 pages.

Vaswani A., et al., "Attention Is All You Need," Advances in Neural Information Processing Systems, December (NIPS), 2017, pp. 5998-6008.

Vincent P., et al., "Extracting and Composing Robust Features with Denoising Autoencoders," International Conference on Machine learning (ICML), 2008, pp. 1096-1103.

Vincent P., et al., "Stacked Denoising Autoencoders: Learning Useful Representations in a Deep Network With a Local Denoising Criterion," Journal of Machine Learning Research (JMLR), 2010, pp. 3371-3408.

Wang H., et al., "Learning Robust Global Representations by Penalizing Local Predictive Power," Neural Information Processing Systems (NeurIPS), 2019, 13 pages.

Wang X., et al., "Unsupervised Learning of Visual Representations using Videos," Proceedings of the IEEE International Conference on Computer Vision (ICCV), 2015, pp. 2794-2802.

Wu Z., et al., "Unsupervised Feature Learning via Non-Parametric Instance Discrimination," Conference on Computer Vision and Pattern Recognition (CVPR), 2018, pp. 3733-3742.

Xiao T., et al., "Early Convolutions help Transformers See Better," Advances in Neural Information Processing Systems, 2021, 9 pages.

Xiao T., et al., "Unified Perceptual Parsing for Scene Understanding," European Conference on Computer Vision (ECCV), 2018, 17 pages.

Yosinski J., et al., "How Transferable are Features in Deep Neural Networks?," Advances in Neural Information Processing Systems, 2014, 9 pages.

You Y., et al., "Large Batch Training of Convolutional Networks," Technical Report, Sep. 13, 2017, 8 pages.

Yuan L., et al., "Volo: Vision Outlooker for Visual Recognition," arXiv preprint arXiv:2106.13112, 2021, 12 pages.

Yun S., et al. "Cutmix: Regularization Strategy to Train Strong Classifiers with Localizable Features," Proceedings of the IEEE/CVF International Conference on Computer Vision (ICCV), 2019, pp. 6023-6032.

Zhang H., et al., "Mixup: Beyond Empirical Risk Minimization," International Conference on Learning Representations, arXiv: 1710.09412v2, Apr. 27, 2018, 13 pages.

Zhang R., et al., "Colorful Image Colorization," European Conference on Computer Vision (ECCV), 2016, 25 pages.

Zhou B., et al., "Semantic Understanding of Scenes Through the ADE20K Dataset," International Journal of Computer Vision (IJCV), 2019, 19 pages.

Zhou B., et al., "Learning Deep Features for Scene Recognition using Places Database," Advances in Neural Information Processing Systems, 2014, 9 pages.

\* cited by examiner

MASKED AUTOENCODERS FOR COMPUTER VISION

TECHNICAL FIELD

This disclosure generally relates to masked autoencoders (MAE) for computer vision. In particular, the disclosure relates to pre-training a machine-learning model based on MAE approach and applying pre-trained model to other models for downstream or recognition tasks.

BACKGROUND

Deep learning has witnessed an explosion of architectures of continuously growing capability and capacity. Aided by the rapid gains in hardware, models today may easily overfit many images (e.g., million images) and begin to demand hundreds of millions of, often publicly inaccessible, labeled images. This appetite for data has been successfully addressed in natural language processing (NLP) by self-supervised pre-training. Solutions, based on autoregressive language modelling and masked autoencoding in prior approaches (e.g., generative pre-trained transformer (GPT), bidirectional encoder representations from transformers (BERT)), are conceptually simple. This may include removing a portion of the data and learn to predict the removed content. These methods now enable training of generalizable NLP models containing over one hundred billion parameters.

The idea of mask autoencoders, a form of more general denoising autoencoders, is natural and applicable in computer vision as well. However, despite significant interest in this idea following success of some prior approaches (e.g., BERT) in the field of NLP, there has not been much progress made in the field of computer vision. Stated differently, progress of autoencoding methods in vision lags behind NLP. For instance, in vision, convolutional networks typically operate on regular grids, and it is not straightforward to integrate 'indicators' such as mask tokens or positional embeddings into convolutional networks. Second, information density is different between language and vision. Languages are human-generated signals that are highly semantic and information-dense. When training a model to predict only a few missing words per sentence, this task appears to induce sophisticated language understanding. Images, on the contrary, are natural signals with heavy spatial redundancy—e.g., a missing patch may be recovered from neighboring patches with little high-level understanding of parts, objects, and scenes. Additionally, the autoencoder's decoder, which maps the latent representation back to the input, plays a different role between reconstructing text and images. In computer vision, the decoder may need to reconstruct pixels, hence its output may be of a lower semantic level than common recognition tasks. This is in contrast to language, where the decoder predicts missing words that contain rich semantic information. As such, there is a need for a technique for applying the masked autoencoders or masked autoencoding to computer vision.

SUMMARY OF PARTICULAR EMBODIMENTS

Embodiments described herein relate to pre-training a first machine-learning (ML) model including an encoder and a lightweight decoder based on a masked autoencoder (MAE) approach and then using the encoder of pre-trained ML model in a second ML model, neural network, or architecture for a computer vision task. For instance, the first ML model may be pre-trained to reconstruct pixels or patches of an input image with missing pixels or patches, whereas the second model may be configured to perform downstream or recognition tasks, such as for example and without limitation, object detection and segmentation, image classification, semantic segmentation, etc.

In particular embodiments, the first ML model may be pre-trained based on a plurality of images. During the pre-training, an image may be divided into a plurality of patches. For instance, the image may be split or divided into a grid of non-overlapping patches. Responsive to dividing the image into patches, a first subset of these patches may be selected to be visible (also interchangeably herein referred to as visible patches) and a second subset of these patches may be selected to be masked (also interchangeably herein referred to as masked patches) during the pre-training process. In particular embodiments, the selection of which patches to be made visible and which ones to be masked may be performed or done according to masking criteria. The masking criteria may be predefined. In particular embodiments, the masking criteria may include a particular masking ratio and a particular masking technique. By way of an example and without limitation, the particular masking ratio may be 75%. The particular masking technique may be one of a random sampling technique, a block-wise sampling technique, or a grid-wise sampling technique.

In particular embodiments, the encoder of the first ML model may process the first subset of patches (e.g., visible patches) to generate corresponding first latent representations. For instance, for each visible patch, the encoder may generate a corresponding latent representation. Responsive to generating the encoded patches or first latent representations corresponding to the first subset of patches, a full set or list of tokens corresponding to the original set of patches may be generated. The full set of tokens may be generated by adding (1) mask tokens along with positional encodings or embeddings corresponding to the second subset of patches (e.g., masked patches) to (2) the first latent representations corresponding to the first subset of patches (e.g., visible patches). The full set or list of tokens may be re-arranged (e.g., unshuffled) based on the positional encodings/embeddings associated with the first and second subsets of patches. The re-arranging may align all tokens with their targets. Stated differently, re-arranging the full set of tokens may align the tokens with their respective locations in the original image. The decoder may then be applied to this full set of tokens (with positional embeddings added).

In particular embodiments, the decoder of the first ML model may process the full set or list of tokens including (1) the first latent representations corresponding to the first subset of patches (e.g., visible patches) and (2) mask tokens corresponding to the second subset of patches (e.g., masked patches) to generate reconstructed patches corresponding to the masked patches. The reconstructed patches generated by the decoder may include predicted pixel values for each masked patch. In particular embodiments, the reconstructed patches and the first subset of patches (e.g., visible patches) may be used to generate a reconstructed image. One or more parameters of the first ML model may be updated based on comparisons between the original image and the reconstructed image. In some embodiments, updating the first machine-learning model may be done based on a loss function. For instance, the loss function may compute differences between predicted pixels values corresponding to the reconstructed patches by the decoder and ground-truth pixel values corresponding to the second subset of patches (e.g., masked patches). Based on the loss function and/or the comparison, one or more parameters of the encoder and/or the decoder of the first ML model may be updated. The updated model may then be tested for a second image in a training set of images or for a next iteration. The pre-training process may be repeated until a stopping condition is reached. The stopping condition may include, for example and without limitation, completion of a preset number of iterations (e.g., 800 iterations) or processing of all the images in the training set.

In particular embodiments, responsive to determining that the pre-training of the first ML model is complete, the decoder may be discarded, and the encoder of pre-trained first ML model may be applied to a second ML model to perform a particular task. The particular task may be a computer vision task or a recognition task. By way of an example and without limitation, the particular task may be one of an object detection task, a semantic segmentation task, an image classification task, an instance segmentation task, etc. In particular embodiments, the encoder of the pre-trained first ML model when applied to the second model, network, or architecture may be further refined or configured according to the particular task discussed herein. Example refinement techniques by which the pre-trained encoder may be refined may include a fine-tuning technique, a linear probing technique, or a partial fine-tuning technique.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
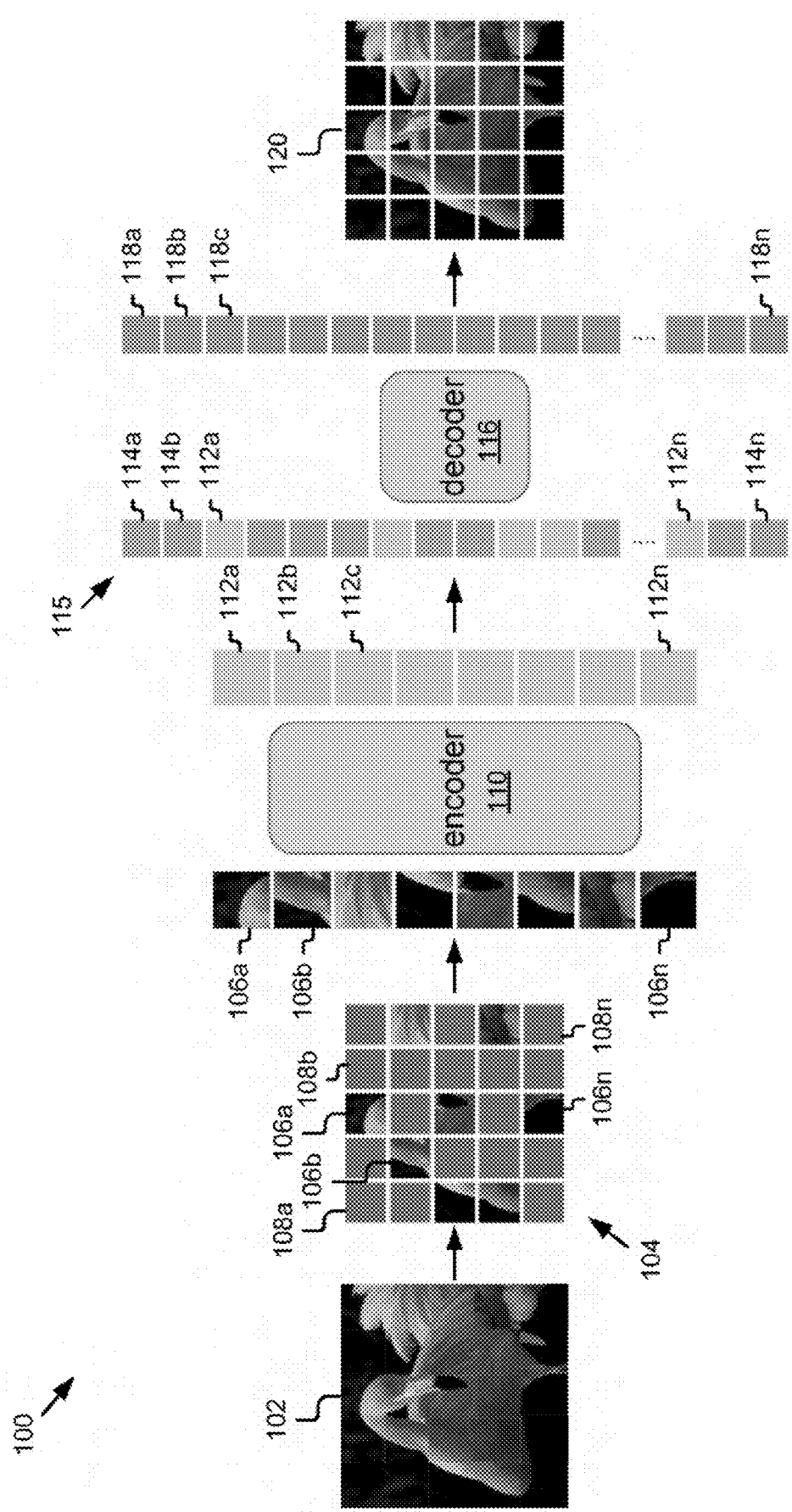
FIG. 1 illustrates an overall masked autoencoder architecture or pre-training process for pre-training a machine-learning model, in accordance with particular embodiments.

Particular embodiments described herein relates to using a collection of images (or videos) on their own without any accompanying labels in order to train parameters of a machine-learning (ML) model or a neural network such that those parameters may be used for a variety of other tasks (e.g., computer vision or recognition tasks). This initial process of training the parameters of the network with unlabeled images is often called as pre-training. Specifically, the present disclosure relates to pre-training a first ML model or neural network (e.g., unsupervised training) and using part of the pre-trained model or network in a second ML model or neural network architecture to perform one or more downstream or recognition tasks. The downstream tasks may be different from a task on which the first ML model was pre-trained. For instance, the first model may be pre-trained to reconstruct pixels or patches of an input image with missing pixels or patches, whereas the second model may be configured to perform downstream or recognition tasks, such as for example and without limitation, object detection and segmentation, image classification, semantic segmentation, etc.

The pre-training process discussed herein is based on a masked autoencoder (MAE) approach, which is an approach that reconstructs an original signal given its partial observation. For instance, during the pre-training process, a large random subset of image patches (e.g., 75%) is masked out or removed from an input image and then missing patches of the input image in the pixel space are reconstructed. The MAE approach discussed herein has an asymmetric encoder-decoder design. In other words, the MAE architecture may include an encoder and a decoder. The encoder may be applied to a small subset of visible patches (e.g., image patches remaining after the masking). The encoder maps the observed signal (e.g., each visible patch) to a latent representation. Latent representations or full set of encoded patches output by the encoder and mask tokens corresponding to the subset of image patches that were masked out may then be input into the decoder, which reconstructs the original image in pixels.

The decoder discussed herein may a lightweight decoder. Shifting the mask tokens to a small decoder in such an asymmetric encoder-decoder design discussed above results in a large reduction in computation. Under this design, a very high masking ratio (e.g., 75%) may achieve a win-win scenario. For instance, it optimizes accuracy while allowing the encoder to process only a small portion (e.g., 25%) of patches. This may reduce overall pre-training time (e.g., by 3× or more) and likewise reduce memory consumption, enabling one to easily scale the MAE approach discussed herein to large models for downstream tasks discussed herein. Also, it has been observed that the pre-training process discussed herein achieves better results than its supervised pre-training counterparts, and more importantly, significant gains have been observed by scaling up models. These observations are aligned with those witnessed in self-supervised pre-training in NLP.

In particular embodiments, after the pre-training is complete, the decoder may be discarded and the encoder may be applied to uncorrupted images (e.g., full set of patches) for one or more downstream or recognition tasks. For instance, the pre-trained encoder (e.g., encoder obtained after the pre-training process) may be used in a different neural network, ML model, or architecture for different downstream or recognition tasks, such as object detection and segmentation, semantic segmentation, image classification, etc. The pre-training process is discussed in detail below in reference to FIG. 1.

FIG. 1 illustrates an overall masked autoencoder architecture or pre-training process 100 for pre-training a machine-learning model. The model may be pre-trained based on a plurality of images that may be accessed or retrieved from a data store, such as storage 1006 shown in FIG. 10. Although, a single input image 102 is shown in the pre-training process 100 of FIG. 1, it should be noted that the pre-training is not limited to the single image and a plurality of images may be used to pre-train the model. As depicted, an input image 102 may be first divided into a grid of regular non-overlapping patches 104 and a subset of these patches 104 may be masked or removed according to some masking criteria. The masking criteria may be predefined. According to the masking criteria, a first subset of patches 106a, 106b, . . . , 106n (individually and/or collectively herein referred to as 106) may be selected to be visible (also interchangeably herein referred to as visible patches 106 or unmasked patches 106) and a second subset of patches 108a, 108b, . . . , 108n (individually and/or collectively herein referred to as 108) may be selected to be masked (also interchangeably herein referred to as masked patches 108) during the pre-training. The masked patches 108 are shown by greyed-out patches in FIG. 1.

Figure 2:
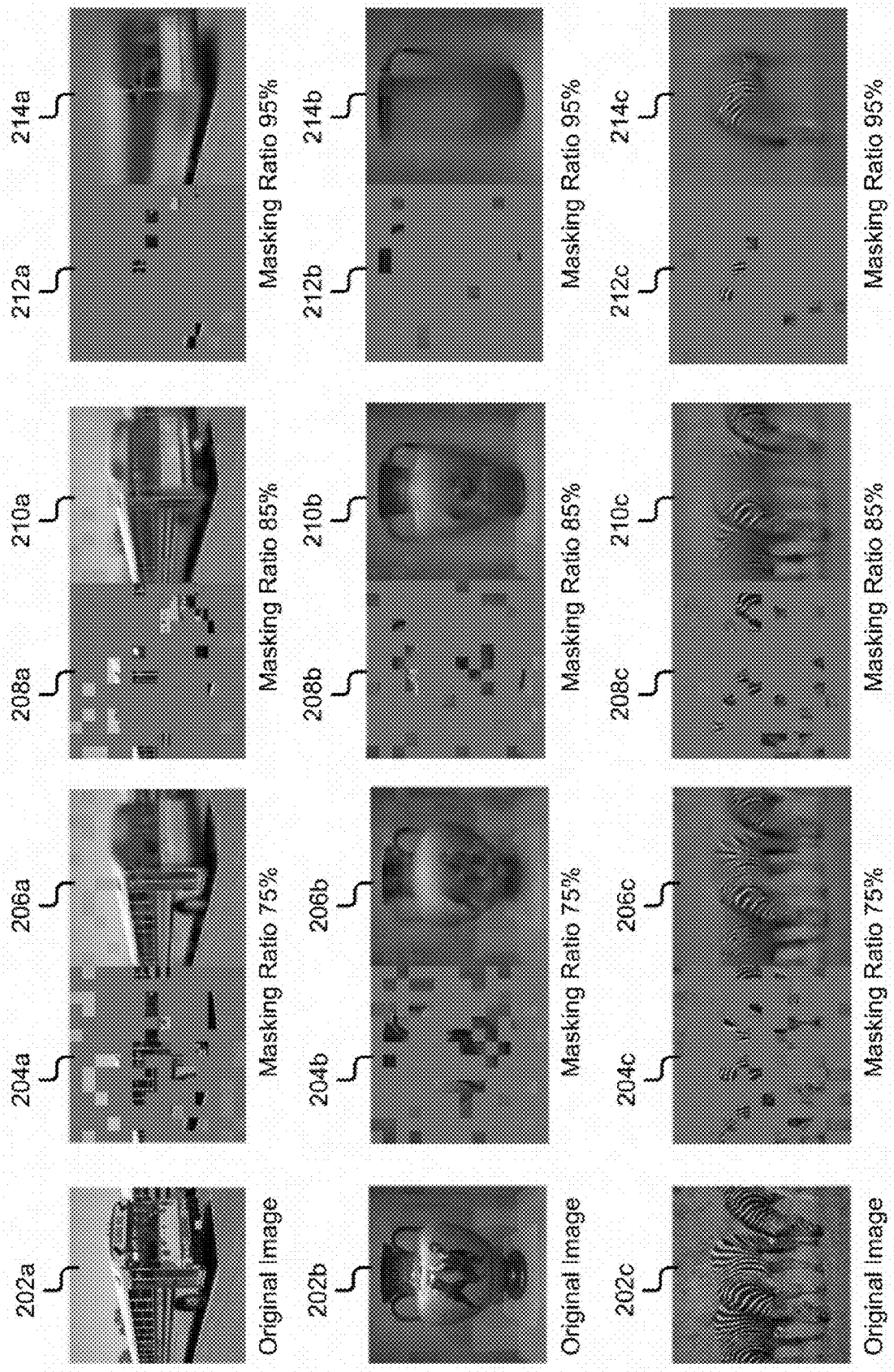
FIG. 2 illustrates example input and output images based on different masking ratios.

In particular embodiments, one of the masking criteria for masking a subset of patches may include a masking ratio indicating an amount or portion of the input image that may be masked or removed. For example, the masking ratio may indicate what percentage of the input image may be masked out or removed. FIG. 2 illustrates example input and output images based on different masking ratios. In particular, FIG. 2 illustrates (1) example input images 202a-202c (individually or collectively herein referred to as 202), (2) example images 204a-204c after sampling based on 75% masking ratio (e.g., 75% of patches from the input image 202 are removed or masked) and corresponding output images 206a-206c that may be generated by the model discussed herein based on its pre-training if the 75% masking ratio is used, (3) example images 208a-208c after sampling based on 85% masking ratio (e.g., 85% of patches from the input image 202 are removed or masked) and corresponding output images 210a-210c that may be generated by the model discussed herein based on its pre-training if the 85% masking ratio is used, and (4) example images 212a-212c after sampling based on 95% masking ratio (e.g., 95% of patches from the input image 202 are removed or masked) and corresponding output images 214a-214c that may be generated by the model discussed herein based on its pre-training if the 95% masking ratio is used.

Figure 3:
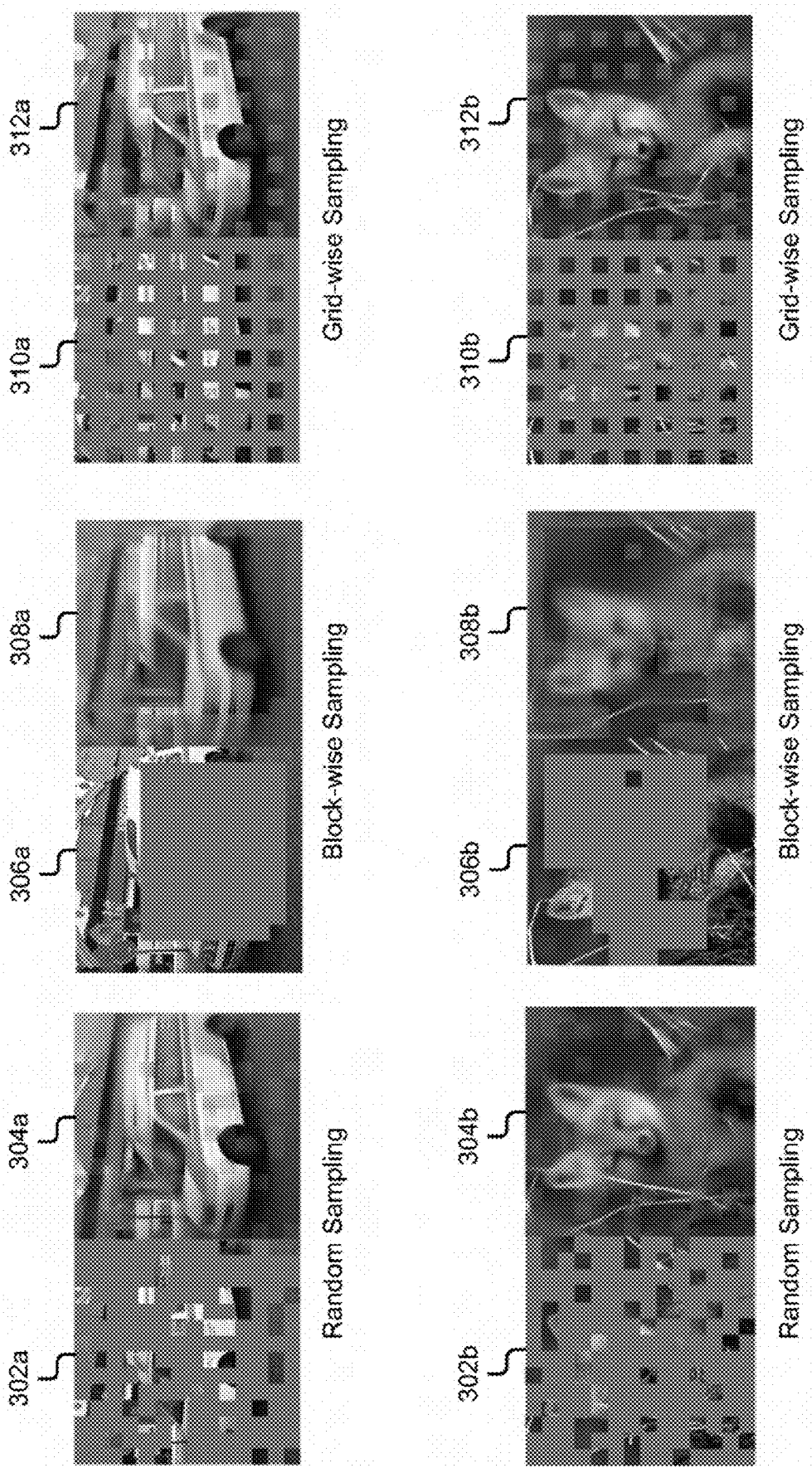
FIG. 3 illustrates example images and corresponding output images processed based on different sampling techniques.

In particular embodiments, another masking criterion for masking the subset of patches may include a particular sampling or masking technique with which to sample the subset of patches and mask (i.e., remove) the remaining ones. The particular sampling technique may be one of a random sampling technique, a block-wise sampling technique, or a grid-wise sampling technique. In the random sampling technique, random patches may be selected from a set of patches and these selected random patches may be masked out (e.g., removed) from an input image, as shown for example by images 302a and 302b in FIG. 3. In the block-wise sampling technique, large random blocks may be removed, as shown for example by images 306a and 306b in FIG. 3. In the grid-wise sampling technique, one of every four patches may be kept, and remaining ones may be removed or masked out, as shown for example by images 310a and 310b in FIG. 3. FIG. 3 illustrates example images and corresponding output images processed based on the random sampling technique, the block-wise sampling technique, and the grid-wise sampling technique, respectively. In particular, FIG. 3 illustrates (1) example images 302a and 302b processed based on random sampling and corresponding output images 304a and 304b, respectively, that may be generated by the model discussed herein based on its pre-training if the random sampling technique is used, (2) example images 306a and 306b processed based on block-wise sampling and corresponding output images 308a and 308b, respectively, that may be generated by the model discussed herein based on its pre-training if the block-wise sampling technique is used, and (3) example images 310a and 310b processed based on grid-wise sampling and corresponding output images 312a and 312b, respectively, that may be generated by the model discussed herein based on its pre-training if the grid-wise sampling technique is used.

It may be noted from FIGS. 2 and 3 that the random sampling technique with a masking ratio of 75% works best for masking a subset of patches from an input image. In some embodiments, random sampling with a high masking ratio (i.e., the ratio of removed patches) is advantageous as it largely eliminates redundancy, thus creating a task that cannot be easily solved by extrapolation from visible neighboring patches. The uniform distribution prevents a potential center bias (i.e., more masked patches near the image center). Finally, the highly sparse input creates an opportunity for designing an efficient encoder, such as encoder 110 discussed herein. It should be noted that the pre-training process 100 discussed herein is not by any way limited to a particular sampling technique (e.g., random sampling) and/ or a masking ratio (e.g., 75%) and other sampling techniques and masking ratios are also possible and within the scope of the present disclosure.

Referring back to FIG. 1, in particular embodiments, the input image 102 may be divided into a plurality of patches 104 and patches 108 may be removed or masked based on the random sampling technique and masking ratio of 75%. In some embodiments, masking a subset of patches may include generating a token for every input patch 104 (e.g., by linear projection with an added positional encoding), randomly shuffling generated set of tokens, and removing a last portion of the set based on the masking ratio (e.g., 75%) and particular sampling technique (e.g., random sampling). This process may produce a small subset of tokens for the encoder 110 and may be equivalent to sampling patches without replacement.

Responsive to masking the second subset of patches or masked patches 108, the first subset of patches or visible patches 106 may be input into an encoder 110. In particular embodiments, the encoder 110 discussed herein is a transformer encoder, as shown and discussed in further detail below in reference to FIG. 4A. At a high level, the encoder 110 embeds the visible patches 106 by a linear projection with added positional embeddings, and then processes the resulting set via a series of Transformer blocks or layers. The output after processing by the series of transformer blocks is a latent representation 112 (e.g., vector representation or features) corresponding to each visible patch 106 that was input into the encoder 110. By way of an example and without limitation, the encoder 110 may output or generate a latent representation 112a corresponding to a visible patch 106a, a latent representation 112b corresponding to a visible patch 106b, a latent representation 112n corresponding to a visible patch 106n, so on and so forth. A latent representation 112 corresponding to a patch 106 may encode or represent useful information associated with the patch 106. For instance, the useful information associated with the latent representation 112 may be used to associate or relate the corresponding patch 106 with other visible patches 106 and understand how or where the corresponding patch 106 belongs to the image 102. As discussed elsewhere herein, the encoder 110 operates on a small subset 106 (e.g., 25%) of the full set of patches 104. Masked patches 108 are removed and no mask tokens are used. This allows one to train very large encoders with only a fraction of computing time and memory. The full set of tokens is handled by a lightweight decoder 116, as discussed later below. The masking operation discussed herein forces the network to learn or work on sparse distributed information from an image (e.g., with missing pixels/patches) that provides small subtle cues of what the rest of the image would look like. As an example, if there is a curve in an image with missing patches/pixels, then the curve might be a part of the larger curve structure, or it might be forming a circle. So, in a sense, the masking operation globalizes the information. A latent representation 112 generated by the encoder 110 helps to understand role of corresponding patch within an image and tries to relate it with other bits of visible information. The pre-training process discussed herein causes the latent representation for each patch to contain a lot of useful information, which may be later useful when applied to other models or networks for one or more downstream tasks.

Figures 4A, 4B:
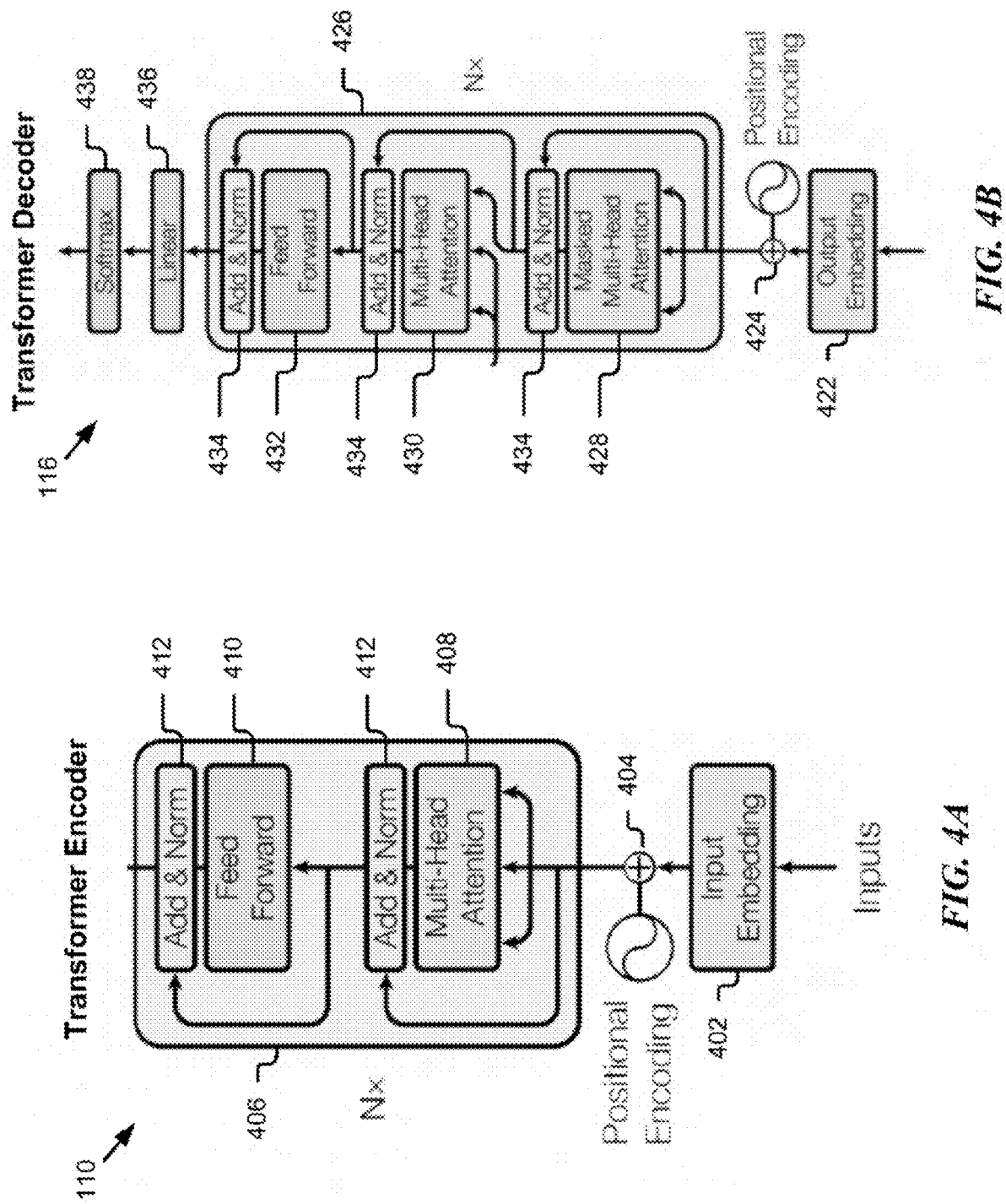
FIG. 4A illustrates an example architecture of a transformer encoder, in accordance with particular embodiments.
FIG. 4B illustrates an example architecture of a transformer decoder, in accordance with particular embodiments.

FIG. 4A illustrates an example architecture of a transformer encoder 110, in accordance with particular embodiments. The transformer encoder 110 begins by receiving input embeddings 402. The input embeddings 402 may include patch-level embeddings (e.g., features associated with visible patches 106). Next, positional information 404 may be injected into the embeddings 402. Because the transformer encoder 110 has no recurrence like recurrent neural networks, some information about the positions (e.g., position of each visible patch 106 in the input image 102) may need to be added into the input embeddings 402. This is done using positional encoding 404. Next, the resulting embedding (i.e., the input embeddings 402 plus positional encoding 404) may be passed through multiple layers or blocks 406 of the encoder 110. At a high level, the encoder layers 406 job is to map all input sequences into an abstract continuous representation that holds the learned information for that entire sequence. Although a single transformer encoder layer or block 406 is depicted in FIG. 4A, it should be understood that there may be multiple encoder layers or blocks 406, where results from a first layer of the transformer encoder 110 may be provided as input to a subsequent layer of the transformer encoder 110, and the results from the final layer of the transformer encoder 110 may be used as input for the decoder 116.

As illustrated in FIG. 4A, a particular encoder layer 406 may include two sub-modules, including a multi-head attention component 408, followed by a feed forward network 410. There may also be residual connections around each of the two sublayers followed by a layer normalization 412. In particular embodiments, the multi-head attention component 408 applies a specific attention mechanism called self-attention. Self-attention allows to associate each patch in an input image to other patches. More specifically, the multi-head attention component 408 is a component in the transformer encoder 110 that computes attention weights for the input and produces an output vector with encoded information on how each patch should attend to other patches in the input image 102. In other words, the multi-head attention component 408 determines which parts/portions of the input image 102 are important. Stated differently, the multi-head attention component 408 may decide or determine what portions (e.g., objects) of the input image 102 should the focus or attention be given to.

The output vector produced by the multi-head attention 408 is added to the original positional input embedding. This is called a residual connection. The output of the residual connection goes through a layer normalization 412. The normalized residual output gets projected through a pointwise feed-forward network 410 for further processing. In some embodiments, the pointwise feed-forward network 410 is a couple of linear layers with a ReLU activation in between. The output of that is then again added to the input of the pointwise feed-forward network 410 and further normalized. The residual connections help the network train, by allowing gradients to flow through the networks directly. The layer normalizations 412 are used to stabilize the network which results in substantially reducing the training time necessary. The pointwise feedforward layer 410 is used to project the attention outputs potentially giving it a richer representation.

The operations performed by the transformer encoder 110, as discussed above, encode the input (e.g., each visible patch 106) into a continuous representation with attention information or more simply into a latent representation 112. This latent representation 112 corresponding to each visible patch 106 may be provided to the decoder 116, which will help the decoder 116 focus on the appropriate portions during the decoding process to generate or reconstruct missing pixels or patches that were masked out, as discussed in further detail below.

Returning to FIG. 1, once the latent representations 112 corresponding to the visible patches 106 are obtained through the encoder 110, mask tokens 114a, 114b, . . . , 114n (also individually and/or collectively herein referred to as 114) corresponding to the masked patches 108 may be added to the latent representations 112 to form a full set of tokens corresponding to the patches 104. For instance, after encoding, the list of mask tokens 114 (e.g., vectors or latent representations corresponding to masked patches 108) may be appended to the list of encoded patches 112 to form a full list or set 115, which may be unshuffled (e.g., inverting the random shuffle operation that was earlier performed during masking) to align all tokens with their targets. As discussed elsewhere herein, no sparse operations may be needed. This simple implementation introduces negligible overhead as the shuffling and unshuffling operations are fast.

Each mask token may be shared, learned vector that indicates presence of a missing patch to be predicted. As discussed earlier, the mask tokens may already have positional embeddings associated with them indicating information about their location in the input image 102. In some embodiments, the positional embeddings may be added to all the mask tokens in this full set when the full set 115 of tokens is formed or generated. Responsive to forming the full set of tokens consisting of (1) encoded visible patches (e.g., latent representations 112 corresponding to visible patches 106) and (2) mask tokens corresponding to the masked patches 108, the full set of tokens may be provided as input to the decoder 116. Similar to the encoder 110, the decoder may also a transformer decoder 116, which has another series of transformer blocks, as discussed further below in reference to FIG. 4B.

As discussed elsewhere herein, the decoder 116 may only be used during the pre-training to perform the image reconstruction task (e.g., only the encoder 110 is used to produce image representations for recognition). Therefore, the decoder architecture may be flexible designed in a manner that may be independent of the encoder design. In particular embodiments, the decoder 116 discussed herein may be smaller, narrower, and/or shallower than the encoder 110. As an example, the decoder 116 may have less than 10% computation per token compared to the encoder 110. As another example, the number of layers or blocks 426 of the decoder 116 may be relatively less than the number of layers or blocks 406 of the encoder 110. With this asymmetrical design, the full set of tokens may only be processed by the lightweight decoder, which significantly reduces the pre-training time.

FIG. 4B illustrates an example architecture of a transformer decoder 116, in accordance with particular embodiments. The transformer decoder 116 begins with receiving output embedding 422 representing the full set of tokens, which may include (1) encoded visible patches (e.g., latent representations 112 corresponding to visible patches 106) and (2) mask tokens corresponding to the masked patches 108, as discussed above. In some embodiments, positional encoding 424 may be added to the output embedding 422, as discussed in the transformer encoder architecture of FIG. 4A. The resulting output embedding may then be passed through multiple decoder layers or blocks 426 to obtain or reconstruct missing pixels corresponding to the masked patches 108. Although a single transformer decoder layer 426 is depicted in FIG. 4B, it should be understood that this is not limiting and that there may be multiple decoder layers 426, where results from a first layer of the transformer decoder 116 may be provided as input to a subsequent layer of the transformer decoder 116, and the results from the final layer of the transformer decoder 116 corresponds to reconstructed pixels or patches.

As depicted, a particular decoder layer 426 may consist of a masked multi-head attention component 428, a multi-head attention component 430, and a feedforward artificial neural network 432. There may also be residual connections around each of these sublayers 428, 430, and 432 followed by a layer normalization 434. It should be noted that functioning of some of the components of the decoder layer 426 is similar to the components of the encoder layer 406 and therefore, the description for these components will not be repeated here. For instance, the multi-head attention component 430, the feedforward network 432, and the Add & Norm 434 are similar to the multi-head attention component 408, the feedforward network 410, and the Add & Norm 412, as shown and discussed in reference to FIG. 4A. In some embodiments, one of the differences between the encoder and decoder layers is the masked multi-head attention component 428 and its functioning. For instance, the masking operation in the masked multi-head attention 428 ensures that the model only attends to specific parts of the input so as to reconstruct missing pixels corresponding to the masked patches 108.

The final output, obtained after processing via components of the last decoder layer 426, is then passed through a linear layer 436 and a softmax 438 resulting in a vector indicating probability or predicted pixel values 118 for each masked patch 108. For instance, each element in the decoder's output may be a vector of pixel values 118 representing a patch. The last layer of the decoder 116 may be a linear projection whose number of output channels equals the number of pixels values in a patch. In particular embodiments, the decoder's output (e.g., pixel values 118 for each masked patch 108) may be reshared to form or generate a reconstructed image 120. In some embodiments, an output of the decoder 116 may be normalized pixel values of each masked patch 108. Specifically, a mean and a standard deviation of all pixels in a patch may be computed and then used to normalize this patch. Using normalized pixels as the reconstruction target may improve representation quality.

Responsive to generating the reconstructed image 120, the machine-learning model discussed herein may be updated. The machine-learning model may be updated based on a loss function. The loss function may compute a mean squared error (MSE) between the reconstructed image 120 and the original/input image 102 in the pixel space. In particular embodiments, the model may be updated and/or evaluated only based on results corresponding to masked patches 108. That is, ground-truth pixel values corresponding to the masked patches 108 may be compared with the predicted pixel values 118 corresponding to the masked patches by the decoder 116. Based on the comparison, one or more parameters of the model may be updated.

In particular embodiments, the pre-training process 100 discussed above may be repeated until a stopping condition is reached. The stopping condition may include one or more of training the model for a preset number of iterations (e.g., 1000 iterations) or processing all the input images in a set of training images. At each iteration, one or more parameters of the model may be updated based on the loss function discussed above, and then the updated model may be re-run to process the next input image in the set.

Figure 5:
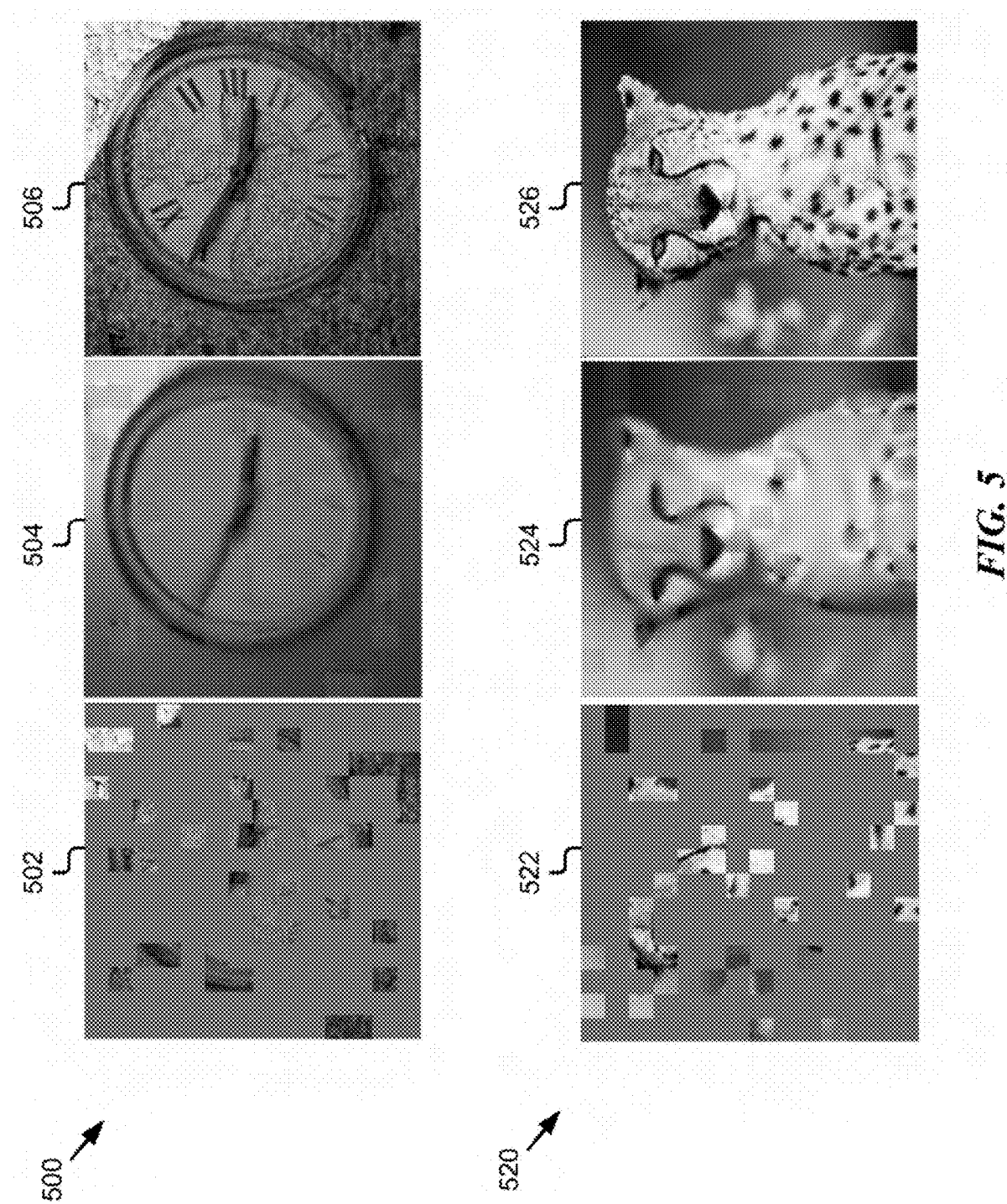
FIG. 5 illustrate two examples of input images that may be feed into pre-trained machine-learning model discussed herein, corresponding output images generated by the model, and original or ground-truth images.

FIG. 5 illustrate two examples 500 and 520 of input images 502, 522 that may be feed into the pre-trained model discussed herein, corresponding output images 504, 524 generated by the model, and original or ground-truth images 506, 526. Specifically, for each triplet in each of these examples 500 and 520, masked image 502 or 522 is shown on the left, output image 504 or 524 reconstructed by the pre-trained model is shown on the middle, and ground-truth image 506 or 526 is shown on the right. In these examples, the masking ratio is 80%, leaving only 39 out of 196 patches. It should be noted that the output images 504, 524 may not look as good or clear as compared to the ground-truth images 506, 526 because the model's evaluation is done based on loss which is computed only on masked patches and not on visible patches. Therefore, the model's output on visible patches is qualitatively worse. In order to improve visual quality (e.g., make an output image 504 or 524 to look similar to ground-truth image 506 or 526), one may simply overlay the output with the visible patches. It should be noted that this has been intentionally opted not to be done here so as to more comprehensively demonstrate the model's behavior at a high level.

As discussed elsewhere herein, responsive to the completion of the pre-training process 100, the decoder 116 may be discarded and the pre-trained encoder 110 (e.g., encoder resulting after the pre-training is complete) may be applied to other machine-learning models, neural networks, or architectures for one or more recognition or downstream tasks. For instance, the pre-trained encoder 110 may be used in or used to replace an encoder of another model or neural network and may be further trained or configured for a particular recognition or downstream task. By way of an example and without limitation, the pre-trained encoder 110 may be used in another model for tasks such as object detection, instance segmentation, semantic segmentation, image classification, etc. Applying pre-trained encoder of a first model to another model, network, or architecture is advantageous as it significantly decreases the time required for programming, training, and/or processing a new machine-learning model or network as it may already contains vital information from a pre-existing or pre-trained model. Training a new machine-learning model or a neural network for a particular task (e.g., object detection, semantic segmentation, instance segmentation, etc.) from scratch may be a time and resource-intensive process. For instance, the neural network may need to be fed tons of data for it to work or perform as intended. Gathering the data for the neural network may take long periods of time. With using a pre-trained encoder (e.g., encoder 110) of a first machine-learning model to a second model or network, the second model may already have most of the data available for it to perform the intended task. Thus, a lot of time and computing resources may be saved by utilizing the data from a similar previously pre-trained model or network. In some instances, applying the pre-trained encoder 110 of a first model to a second model to perform specific tasks is known as transfer learning.

In some embodiments, the pre-trained encoder 110 when applied to another model, network, or architecture may be further refined or configured according to a particular recognition or downstream task discussed herein. Example refinement techniques by which the pre-trained encoder 110 may be refined may include a fine-tuning technique and a linear probing technique. Both techniques are ways of applying or utilizing transfer learning. In particular embodiments, fine-tuning is the process in which parameters of a model may be precisely adjusted in order to fit with certain observations. Stated differently, fine-tuning technique may include taking weights of the pre-trained encoder 110 and customizing or finetuning them for a specific task (e.g., object detection, semantic segmentation, image classification, etc.). In other words, fine-tuning takes part/portion of a first model (e.g., pre-trained encoder 110) trained for a first task (e.g., reconstructing missing pixels of an image or reconstructing image with missing pixels or patches) and then fine-tuning or tweaking it to perform a second similar tasks (e.g., object detection, segmentation, classification, etc.). Linear probing technique, on the other hand, may include just fine tuning the final layer (e.g., linear layer at the very end) of a model instead of finetuning the entire model, as the case with the fine-tuning technique.

Figure 6:
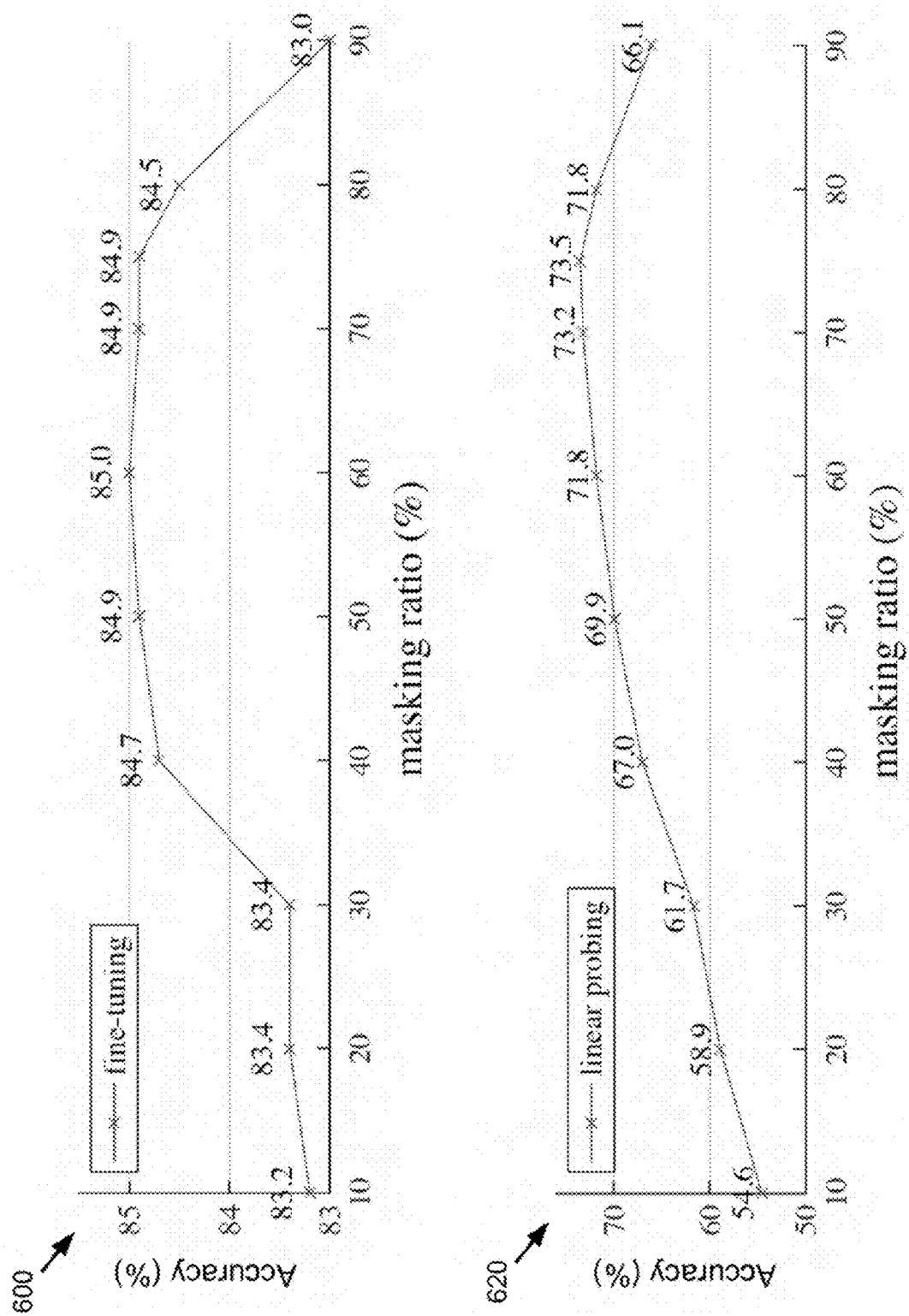
FIG. 6 illustrates example charts comparing accuracy of a fine-tuning technique and a linear probing technique based on different masking ratios, respectively.

In some embodiments, the fine-tuning technique proves out to be a better technique or is generally leads to better accuracy than the linear probing technique. FIG. 6 illustrates example charts 600 and 620 comparing accuracy of the fine-tuning technique and the linear probing technique based on different masking ratios, respectively. In each of these charts 600 and 620, X-axis represents different masking ratios (e.g., in percentages) and Y-axis represents accuracy (e.g., in percentage) of a model in performing a task when an encoder (e.g., encoder 110) was pre-trained based on a particular masking ratio and further trained or refined based on the fine-tuning or the linear probing technique. It may be generally observed from the charts 600 and 620 that a masking ratio of 75% works well for both fine-tuning (top chart 600) and linear probing (bottom chart 620). Additionally, it may be observed that the accuracy of the fine-tuning technique is generally better or higher than the linear probing technique for all masking ratios. By way of an example and without limitation, for the masking ratio of 75%, it may be seen that the accuracy of the fine-tuning technique is 84.9% compared to 73.5% accuracy of the linear probing technique.

Figure 7:
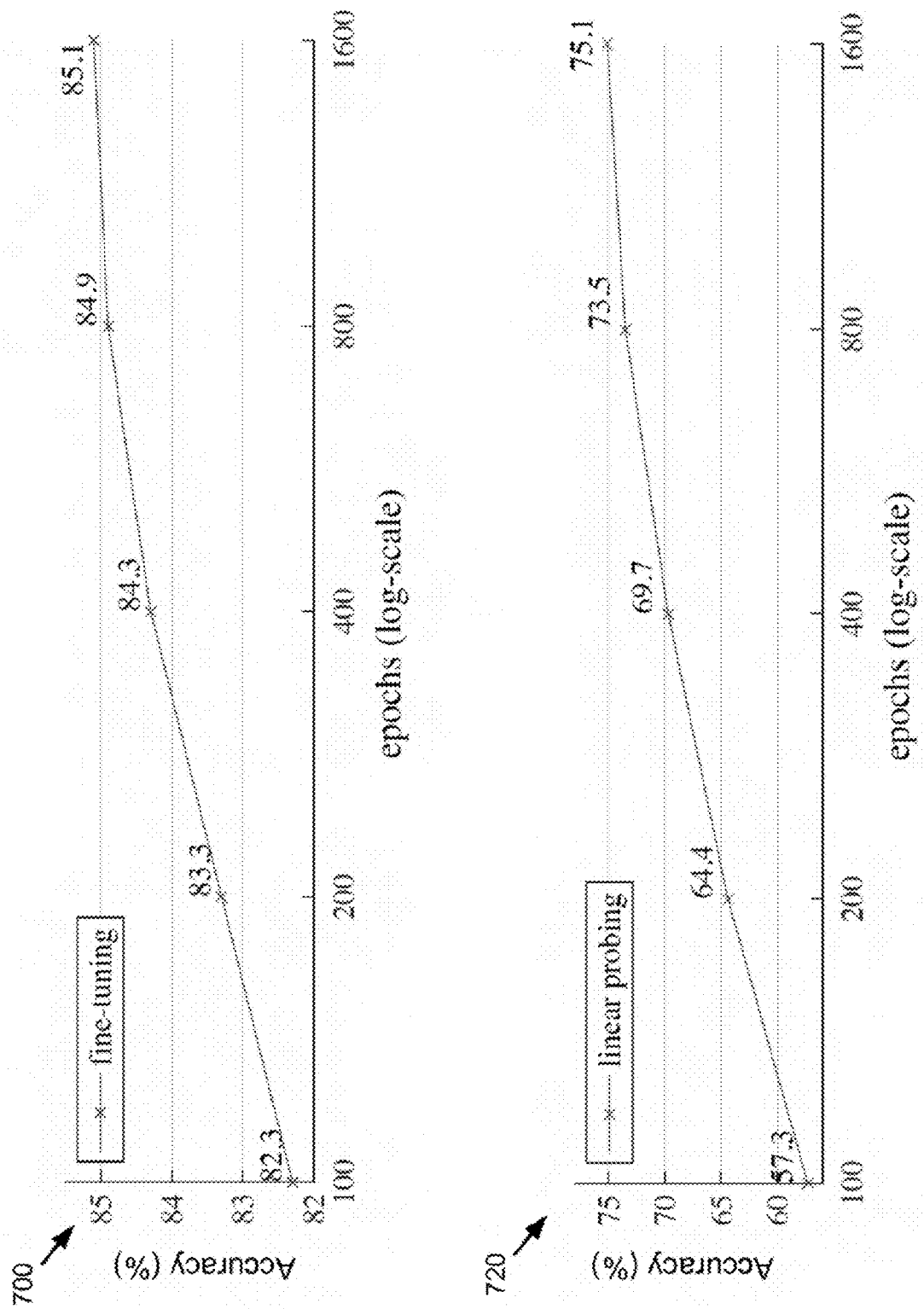
FIG. 7 illustrates another example charts comparing accuracy of a fine-tuning technique and a linear probing technique based on a training schedule, respectively.

FIG. 7 illustrates another example charts 700 and 720 comparing accuracy of the fine-tuning technique and the linear probing technique based on a training schedule, respectively. In each of these charts 700 and 720, X-axis represents training schedule or length of training (e.g., number of iterations used during pre-training) and Y-axis represents accuracy (e.g., in percentage) of a model in performing a task when an encoder (e.g., encoder 110) was pre-trained based on a particular training schedule and further trained or refined based on the fine-tuning or the linear probing technique. It may be generally observed from the charts 700 and 720 that a longer training schedule gives a noticeable improvement in accuracy. That is, the accuracy of both the fine-tuning (top chart 700) as well as linear probing (bottom chart 720) increases with a longer training schedule (e.g., increasing number of iterations). Also, it may be observed from the charts 700 and 720 that 800-epoch pre-training (i.e., 800 iterations for the pre-training) works well for both fine-tuning (top chart 700) and linear probing (bottom chart 720).

Figure 8:
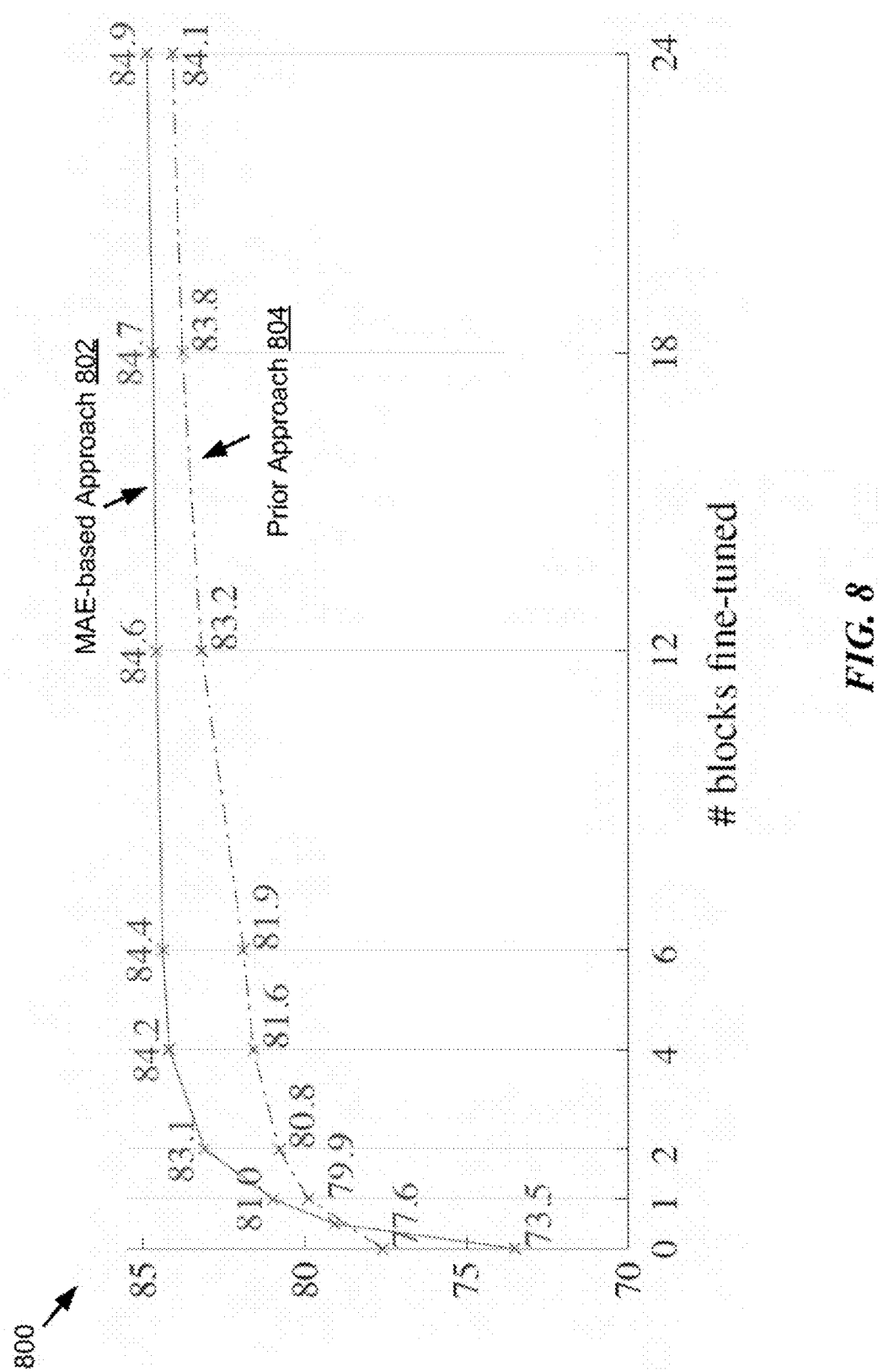
FIG. 8 illustrates an example chart depicting accuracy of a partial fine-tuning technique based on a number of blocks or layers fine-tuned.

In some embodiments, apart from fine-tuning and linear probing techniques discussed herein, a partial fine-tuning technique may also be applied during the transfer learning process for refining or configuring the pre-trained encoder 110 for a particular task. Linear probing has been a popular protocol in the past few years, however, it misses the opportunity of pursuing strong but non-linear features, which is indeed a strength of deep learning. As middle ground, a partial fine-tuning protocol or technique may be adopted. The partial fine-tuning technique may include fine-tuning last several layers while freezing the others. FIG. 8 illustrates an example chart 800 depicting accuracy of the partial fine-tuning technique based on a number of blocks or layers (e.g., transformer blocks) fine-tuned. Here X-axis represents the number of blocks fine-tuned ranging from 0-24 and Y-axis represents accuracy (e.g., in percentage) of a model in performing a task when an encoder (e.g., encoder 110) was pre-trained based on a particular number of transformer blocks and further trained or refined based on the partial fine-tuning technique discussed herein. The chart 800 additionally shows a comparison between accuracy of the partial fine-tuning technique based on the MAE approach (e.g., as discussed in reference to FIG. 1), as indicated by reference numeral 802, and the partial fine-tuning based on a prior approach, as indicated by reference numeral 804. Here tuning 0 blocks is linear probing and tuning all 24 blocks is full fine-tuning. It may be observed from the chart 800 that the MAE representations 802 are less linearly separable, but are consistently better than the prior approach 804 if one or more blocks are tuned. Stated differently, the prior approach 804 has higher linear probing accuracy than the MAE-based approach 802. However, all of its partial fine-tuning results are worse than the fine-tuning results of the MAE-based approach 802. Notably, fine-tuning only one transformer block boosts the accuracy of the MAE-based approach 802 significantly from 73.5% to 81%. Moreover, fine-tuning only "half" of the last block (i.e., its MLP sub-block) gives 79.1% accuracy, which is much better than linear probing. Fine-tuning a few blocks (e.g., 4 or 6 blocks) may achieve decent accuracy, which is still a small fine-tuning head compared with the frozen backbone.

Figure 9:
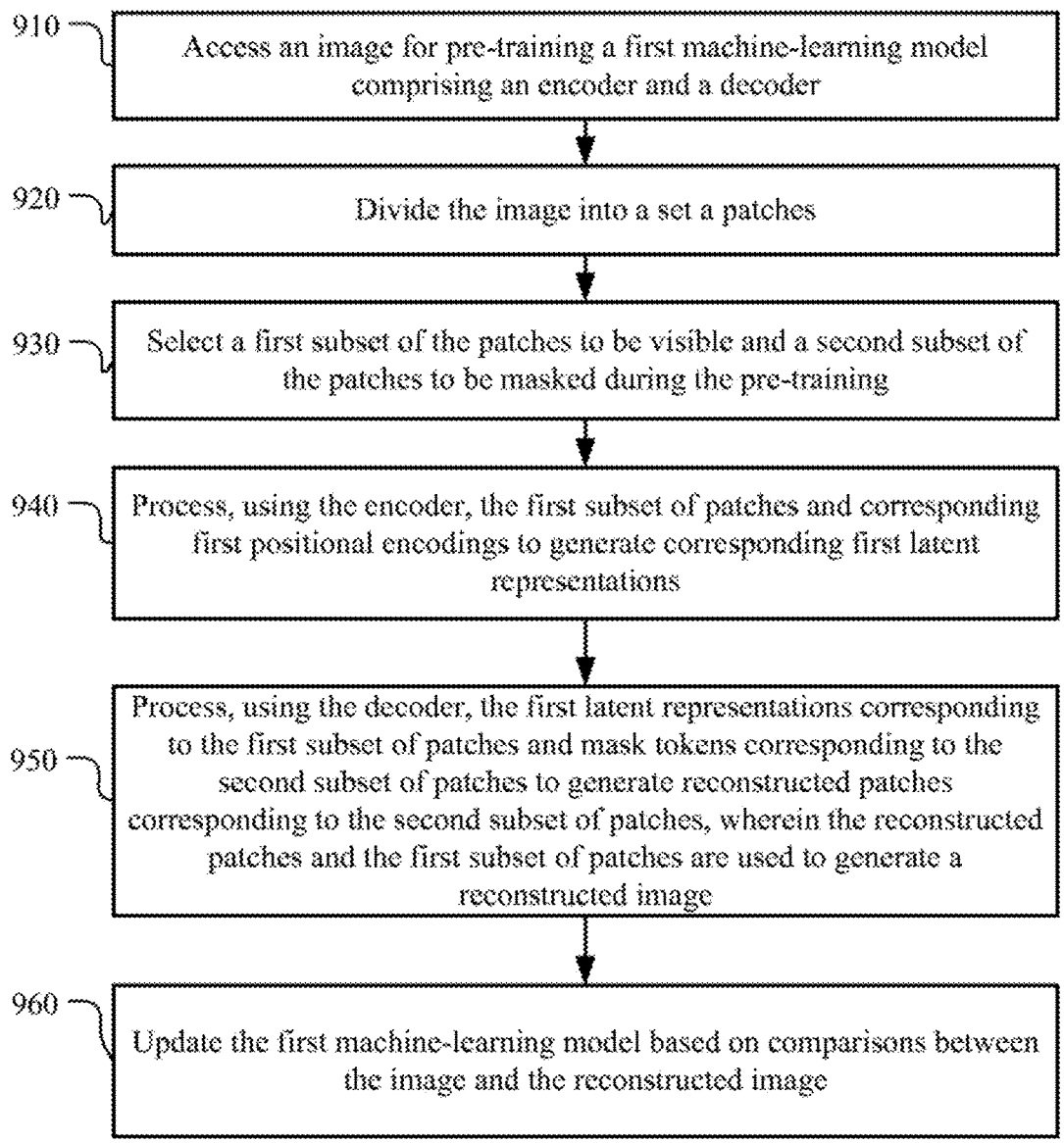
FIG. 9 illustrates an example method for pre-training a machine-learning model, in accordance with particular embodiments.

FIG. 9 illustrates an example method 900 for pre-training a machine-learning model, in accordance with particular embodiments. Specifically, the method 900 illustrates steps performed based on the MAE architecture as discussed in reference to FIG. 1. Although the pre-training process in the method 900 is discussed with respect to a single image, it should be noted that the pre-training is not limited to the single image and a plurality of images may be accessed and used for pre-training the model, as discussed elsewhere herein. The method 900 may begin at step 910, where a computing system (e.g., computing system 1000) may access an image (e.g., image 102) for pre-training a first machine-learning model. The first machine-learning model may include an encoder and a decoder, such as the encoder 110 and the decoder 116, as shown and discussed in reference to FIG. 1. In some embodiments, the encoder discussed herein may be a transformer encoder that may include a first set of transformer layers or blocks, as shown and discussed in reference to FIG. 4A. The decoder discussed herein may also be a transformer decoder that may include a second set of transformer layers or blocks, as shown and discussed in reference to FIG. 4B. In particular embodiments, the decoder discussed herein may be a lightweight decoder or is relatively smaller, narrower, and/or shallower than the encoder. For example, the second set of transformer layers or blocks in the decoder may be relatively less or lower than the first set of transformer layers or blocks in the encoder.

At step 920, the computing system (e.g., computing system 1000) may divide the image into a set of patches. For instance, the image (e.g., image 102) may be split or divided into a grid of non-overlapping patches, such as, for example, grid or patches 104 as shown in FIG. 1. At step 930, the computing system (e.g., computing system 1000) may select a first subset of these patches to be visible (e.g., visible patches 106) and a second subset of these patches to be masked (e.g., masked patches 108) during the pre-training process. In particular embodiments, the selection of which patches to be made visible and which ones to be masked may be performed or done according to masking criteria. The masking criteria may be predefined. In particular embodiments, the masking criteria may include a particular masking ratio and a particular masking technique. By way of an example and without limitation, the particular masking ratio may be 75%, as shown and discussed in reference to FIG. 2. The particular masking technique may be one of a random sampling technique, a block-wise sampling technique, or a grid-wise sampling technique, as shown and discussed in reference to FIG. 3.

In some embodiments, responsive to selecting the first subset of the patches to be visible and the second subset of the patches to be masked in step 930, the computing system (e.g., computing system 1000) may further generate mask tokens corresponding to the second subset of patches (e.g., masked patches 108). Each mask token may be a shared, learned vector that indicates presence of a missing patch to be predicted. Also, positional encodings or embeddings may be added to these mask tokens. Without the positional embeddings, mask tokens would have no information about their location in the image (e.g., input image 102).

At step 940, the computing system (e.g., computing system 1000) may process, using the encoder (e.g., encoder 110), the first subset of patches (e.g., visible patches 106) and corresponding first positional encodings or embeddings to generate corresponding first latent representations. For instance, for each visible patch 106, the encoder may generate a corresponding latent representation 112, as shown and discussed in reference to FIG. 1. Responsive to generating the encoded patches or first latent representations (e.g., latent representations 112) corresponding to the first subset of patches, the computing system (e.g., computing system 1000) may generate a full set or list of tokens (e.g., tokens 115) corresponding to the original set of patches (e.g., patches 104). The full set of tokens may be generated by adding (1) the mask tokens (e.g., mask tokens 114) along with second positional encodings corresponding to the second subset of patches (e.g., masked patches 108) to (2) the first latent representations (e.g., latent representations 112) along with the first positional encodings corresponding to the first subset of patches (e.g., visible patches 106). The full set or list of tokens may then be re-arranged (e.g., unshuffled) based on the first and second positional encodings/embeddings associated with the first and second subsets of patches, respectively. The re-arranging may align all tokens with their targets. Stated differently, the re-arranging the full set of tokens may align the tokens with their respective locations in the image (e.g., input image 102). The decoder may then be applied to this full set of tokens (with positional embeddings added), as discussed below in reference to step 950.

At step 950, the computing system (e.g., computing system 1000) may process, using the decoder (e.g., decoder 116), the full set of tokens (e.g., tokens 115) comprising (1) the first latent representations corresponding to the first subset of patches (e.g., visible patches 106) and (2) mask tokens corresponding to the second subset of patches (e.g., masked patches 108) to generate reconstructed patches corresponding to the second subset of patches. The reconstructed patches (e.g., patches 118a, 118b, . . . , 118n) generated by the decoder may include predicted pixel values for each patch of the second subset of patches (e.g., masked patches 108). In particular embodiments, the reconstructed patches and the first subset of patches (e.g., visible patches 106) may be used to generate a reconstructed image, such as image 120 as shown in FIG. 1.

At step 960, the computing system (e.g., computing system 1000) may update the first machine-learning model based on comparisons between the image (e.g., image 102) and the reconstructed image (e.g., image 120). In some embodiments, updating the first machine-learning model may be done based on a loss function. The loss function may compute a mean squared error (MSE) between the reconstructed and original images in the pixel space. For instance, the loss function may compute differences between the predicted pixels values corresponding to the reconstructed patches by the decoder and ground-truth pixel values corresponding to the second subset of patches (e.g., masked patches 108). It should be noted that the loss may be computed and model may be updated based on comparisons relating to only the masked patches. Based on the loss function and/or the comparison, the computing system (e.g., computing system 1000) may update one or more parameters of the encoder and/or the decoder of the first machine-learning model. The updated model may then be tested for a second image in a training set of images or for a next iteration. The pre-training process (e.g., steps 910-960) may be repeated until a stopping condition is reached. The stopping condition may include, for example and without limitation, completion of a preset number of iterations (e.g., 800 iterations) or processing of all the images in the training set.

Responsive to determining that the pre-training of the first machine-learning model is complete, the computing system (e.g., computing system 1000) may apply the encoder of pre-trained first machine-learning model to a second machine-learning model to perform a particular task. The particular task may be a computer vision task or a recognition task. By way of an example and without limitation, the particular task may be one of an object detection task, a semantic segmentation task, or an image classification task. In some embodiments, the particular task associated with the second machine-learning model may be different from the first machine-learning model. Stated differently, the second machine-learning model may be configured to perform a computer vision task that may be different from a task for which the first machine-learning model is pre-trained on. As an example, the first machine-learning model may be pre-trained to reconstruct pixels or patches of an image with missing pixels or patches, as shown by reference numeral 104 in FIG. 1. In some embodiments, after applying the encoder of the pre-trained first machine-learning model to the second machine-learning model, the encoder may be refined or configured to perform the particular task according to a particular refining technique, as discussed elsewhere herein. The particular refinement technique may be one of a fine-tuning technique, a linear probing technique, or a partial fine-tuning technique. Pre-training the first machine-learning model and then applying encoder of such pre-trained model to another model reduces one or more of training time or memory consumption associated with the first machine-learning model or the second machine-learning model.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for pre-training a machine-learning model, including the particular steps of the method of FIG. 9, this disclosure contemplates any suitable method for pre-training a machine-learning model, including any suitable steps, which may include a subset of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
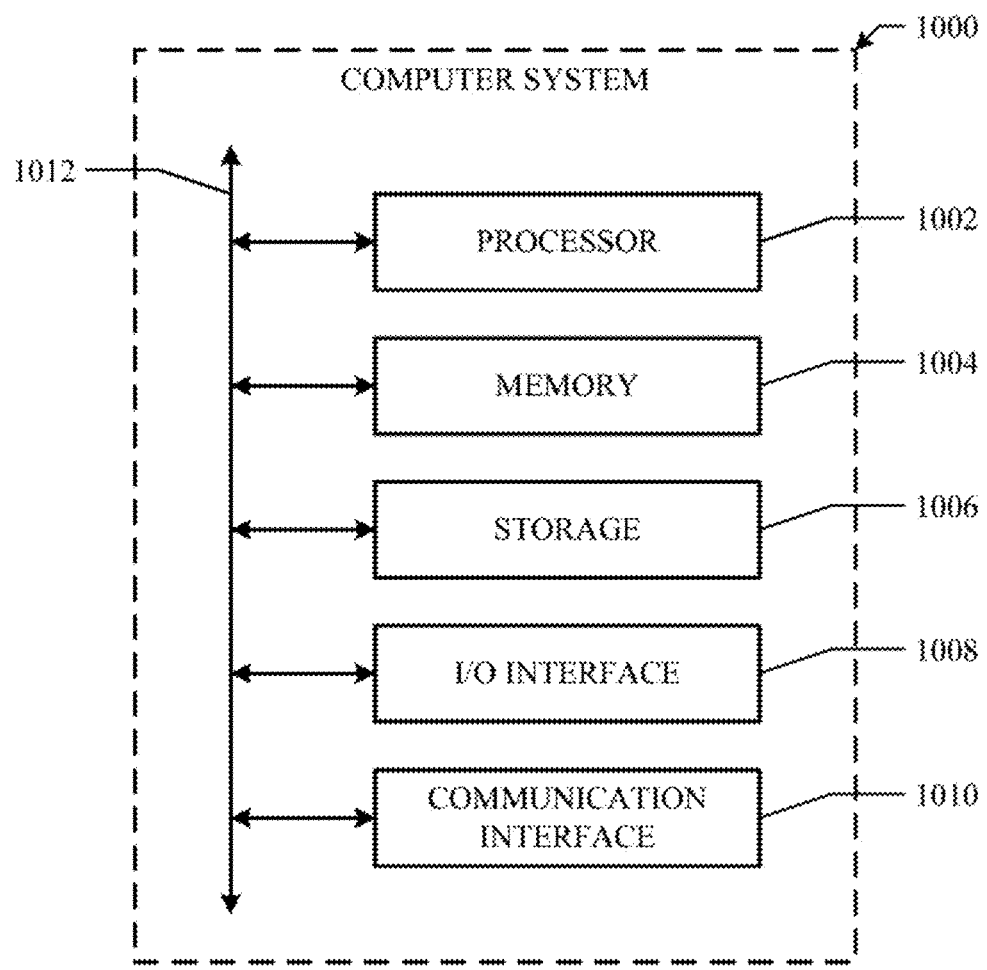
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, implemented by a computing system, comprising:
    accessing a plurality of images to facilitate pre-training a first machine-learning model comprising an encoder and a decoder; and
    using the plurality of images to pre-train the first machine-learning model by:
        dividing at least one image, of the plurality of images, into a set of patches;
        selecting a first subset of the patches to be visible and a second subset of the patches to be masked during the pre-training;
        processing, using the encoder, the first subset of patches and corresponding first positional encodings to generate corresponding first latent representations;
        processing, using the decoder, the first latent representations corresponding to the first subset of patches and mask tokens corresponding to the second subset of patches to generate reconstructed patches corresponding to the second subset of patches, wherein the reconstructed patches and the first subset of patches are used to generate a reconstructed image; and
        updating the first machine-learning model based on comparisons between the at least one image and the reconstructed image.

2. The method of claim 1, further comprising:
    responsive to determining that the pre-training of the first machine-learning model is complete, applying the encoder of the pre-trained first machine-learning model to a second machine-learning model to perform a task.

3. The method of claim 2, wherein the task comprises one of:
    object detection;
    semantic segmentation; or
    image classification.

4. The method of claim 2, wherein the pre-training the first machine-learning model reduces one or more of training time or memory consumption associated with the first machine-learning model or the second machine-learning model.

5. The method of claim 2, wherein after applying the encoder of the pre-trained first machine-learning model to the second machine-learning model, the encoder is refined to perform the task according to a refining technique.

6. The method of claim 5, wherein the refining technique comprises one of:
    a fine-tuning technique;
    a linear probing technique; or
    a partial fine-tuning technique.

7. The method of claim 1, wherein the first machine-learning model is pre-trained to reconstruct pixels of an input image with missing pixels.

8. The method of claim 1, wherein the selecting the first subset of the patches to be visible and the second subset of the patches to be masked is performed according to pre-defined masking criteria.

9. The method of claim 8, wherein the predefined masking criteria comprises:
    a masking ratio; and
    a masking technique.

10. The method of claim 9, wherein the masking ratio is 75%.

11. The method of claim 9, wherein the masking technique comprises one of:
    a random sampling;
    a block-wise sampling; or
    a grid-wise sampling.

12. The method of claim 1, further comprising:
    responsive to the selecting the first subset of the patches to be visible and the second subset of the patches to be masked, generating the mask tokens corresponding to the second subset of patches, wherein the mask tokens comprise vector representations corresponding to the second subset of patches; and adding second positional encodings to the mask tokens, wherein the second positional encodings indicate positions or locations of the second subset of patches in the at least one image.

13. The method of claim 1, wherein prior to the processing, using the decoder, the first latent representations corresponding to the first subset of patches and the mask tokens corresponding to the second subset of patches, the method further comprises:

generating a full set of tokens corresponding to the set of patches by adding (1) the mask tokens along with second positional encodings corresponding to the second subset of patches to (2) the first latent representations along with the first positional encodings corresponding to the first subset of patches; and re-arranging the full set of tokens based on the first positional encodings and the second positional encodings associated with the first subset of patches and the second subsets of patches, respectively, wherein the re-arranging aligns the tokens with their respective locations in the at least one image, and wherein the re-arranged full set of tokens is processed by the decoder to generate the reconstructed patches.

14. The method of claim 1, wherein the reconstructed patches generated by the decoder comprises predicted pixel values associated with patches of the second subset of patches.

15. The method of claim 14, wherein the updating the first machine-learning model based on the comparisons between the at least one image and the reconstructed image comprises:

computing a loss function based on differences between the predicted pixel values corresponding to the reconstructed patches and ground-truth pixel values corresponding to the second subset of patches; and updating one or more parameters of one or more of the encoder or the decoder based on the loss function.

16. The method of claim 1, wherein the set of patches comprises a grid of non-overlapping patches.

17. The method of claim 1, wherein:

the encoder comprises a transformer encoder comprising a first set of layers or blocks; and the decoder comprises a transformer decoder comprising a second set of layers or blocks.

18. The method of claim 17, wherein the second set of layers or blocks in the transformer decoder are relatively lower than the first set of layers or blocks in the transformer encoder.

19. One or more computer-readable non-transitory storage media embodying software that is operable when executed to:

access a plurality of images to facilitate pre-training a first machine-learning model comprising an encoder and a decoder; and use the plurality of images to pre-train the first machine-learning model by:

dividing the image into a set of patches;

selecting a first subset of the patches to be visible and a second subset of the patches to be masked during the pre-training;

processing, using the encoder, the first subset of patches and corresponding first positional encodings to generate corresponding first latent representations;

processing, using the decoder, the first latent representations corresponding to the first subset of patches and mask tokens corresponding to the second subset of patches to generate reconstructed patches corresponding to the second subset of patches, wherein the reconstructed patches and the first subset of patches are used to generate a reconstructed image; and updating the first machine-learning model based on comparisons between the at least one image and the reconstructed image.

20. A system comprising:

one or more processors; and one or more computer-readable non-transitory storage media coupled to the one or more of the processors and comprising instructions operable when executed by the one or more of the processors to cause the system to:

access a plurality of images to facilitate pre-training a first machine-learning model comprising an encoder and a decoder; and use the plurality of images to pre-train the first machine-learning model by:

dividing at least one image, of the plurality of images, into a set of patches;

selecting a first subset of the patches to be visible and a second subset of the patches to be masked during the pre-training;

processing, using the encoder, the first subset of patches and corresponding first positional encodings to generate corresponding first latent representations;

processing, using the decoder, the first latent representations corresponding to the first subset of patches and mask tokens corresponding to the second subset of patches to generate reconstructed patches corresponding to the second subset of patches, wherein the reconstructed patches and the first subset of patches are used to generate a reconstructed image; and updating the first machine-learning model based on comparisons between the at least one image and the reconstructed image.

* * * * *